A. H. MORTON.
TIRE PROTECTOR OR SHIELD.
APPLICATION FILED DEC. 11, 1911.
1,029,215. Patented June 11, 1912.
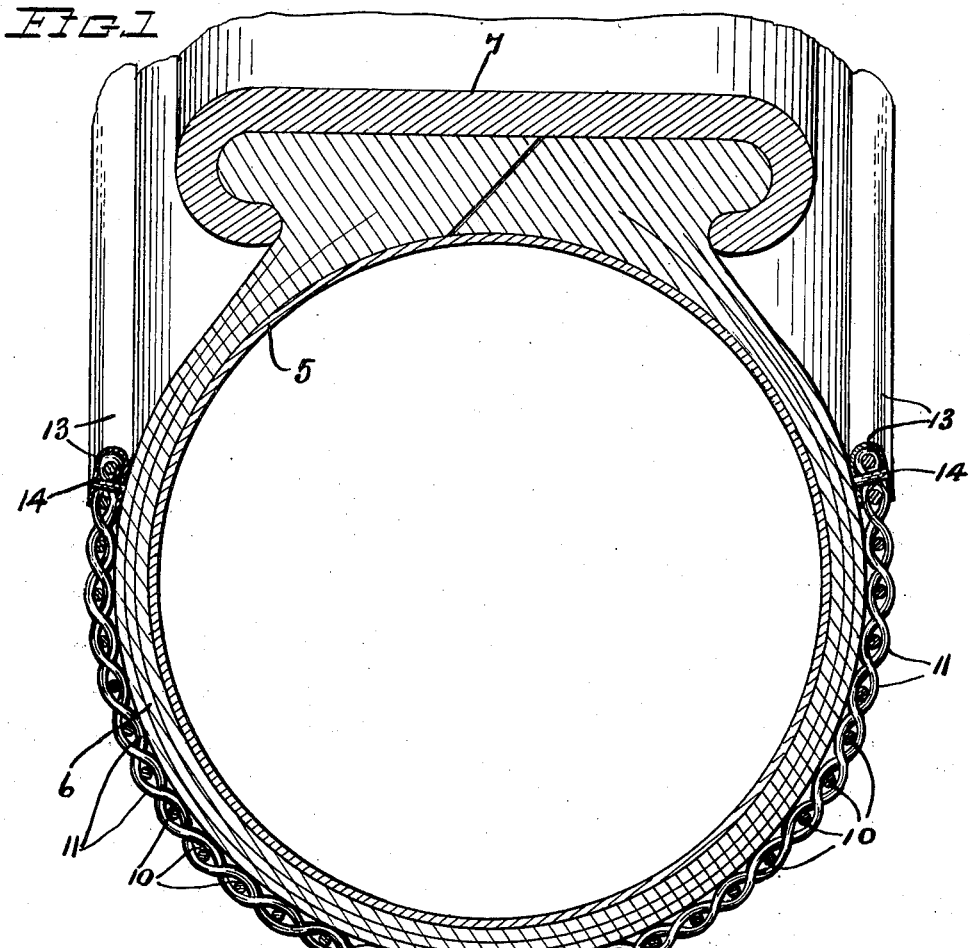
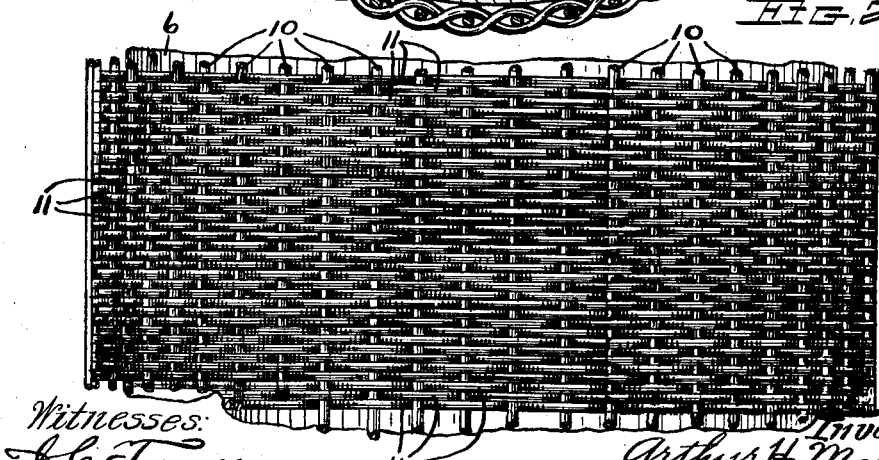

UNITED STATES PATENT OFFICE.

ARTHUR H. MORTON, OF CLEVELAND, OHIO.

TIRE PROTECTOR OR SHIELD.

1,029,215.     Specification of Letters Patent.     Patented June 11, 1912.

Application filed December 11, 1911. Serial No. 664,914.

*To all whom it may concern:*

Be it known that I, ARTHUR H. MORTON, a citizen of the United States of America, residing at Cleveland, in the county of Cuyahoga and State of Ohio, have invented certain new and useful Improvements in Tire Protectors or Shields; and I hereby declare the following to be a full, clear, and exact description of the invention, such as will enable others skilled in the art to which it pertains to make and use the same.

This invention relates to new and useful improvements in tire protectors or shields.

The object of this invention is to provide a protector which can be readily applied to the conventional type of pneumatic tires and which while in no way detracting from the resiliency and buoyancy of the tire will effectually prevent the tire from being punctured or abraded by passing over nails, glass, and the like.

With this object in view and with the intention of securing other advantages which will hereinafter appear, my invention consists of certain new and useful arrangements and combinations of parts, the preferred form of which is shown in the accompanying drawings, described in the specification and particularly pointed out in the claim.

In the accompanying drawings Figure 1 is a section through a pneumatic tire provided with my improved protector. Fig. 2 is a plan view of a portion of the tire and protector.

Again referring to the drawings 5 represents the inner tube and 6 represents the outer casing of a tire of the ordinary construction. The tire is mounted in a clencher rim, shown at 7, which is secured in the usual manner to the felly of the wheel, not shown.

The protector consists of a plurality of rings 10 which are circumferentially disposed with respect to the tire. The rings 10 are preferably circular in cross section and may be formed of steel wire. A series of transversely extending strips or wires 11 are interlaced across the rings 10, the said wires 11 being bent down where they pass under the rings 10, and being curved or bent up where they pass over the rings 10, so that the rings 10 remain perfectly straight without any undulations where they are crossed by the transverse wires 11. It will be understood that the circumferential wires or rings 10 are subject to great strain and are under tension all the time. Now, if the rings 10 were curved or bent where they are interwoven with the transverse wires 11 the tension on the rings 10 would tend to straighten them out and thereby increase the circumference of the protector which would in time become too loose on the tire and the tire would lose traction. Also if the said rings 10 were curved or bent where they are crossed by the transverse wires the transverse wires would not be free to play or move on the circumferential wires which would greatly detract from the flexibility and instead of a general yielding or giving of the whole protector to correspond to the movement of the tire the wires of the protector would be bent sharply back and forth at their points of intersection which would soon result in the breaking of the wires. At each side of the series of circumferential wires is arranged an annular U-shaped binding strip 13 which is smaller in diameter than the diameter of the tire when inflated. The ends of the transverse wires are held in engagement with the binding strips 13 by being clamped between the side members of the strips and small pins 14 are passed through the sides of the strips 13 to hold the sides tightly against the ends of the wires 11.

In applying the protector the tire is first deflated and the protector is slipped over the tire after which the tire is again inflated and the pressure of the tire against the protector holds the protector firmly in position on the tire.

From the foregoing description it will be seen that my protector will form a practically uninterrupted tread around the tire which will be extremely flexible and will yield readily with the movement of the tire but will be impenetrable by nails, pieces of glass and the like.

What I claim is,—

A tire protector comprising a plurality of rings, said rings being substantially geometrical circles, a series of wires disposed transversely of said rings and arranged in close proximity to each other, each transverse wire being interwoven with said rings by being passed alternately under and above said rings, the said transverse wires being bowed down where they pass under said rings and being curved up where they pass
5 over the said rings and means for securing the ends of the transverse wires at each side of the rings to each other.

In testimony whereof, I sign the foregoing specification, in the presence of two witnesses.

ARTHUR H. MORTON.

Witnesses:
   VICTOR C. LYNCH,
   N. L. McDONNELL.